Dec. 30, 1969   L. R. RICHARDS ET AL   3,486,186
MOLDING APPARATUS
Filed May 8, 1967
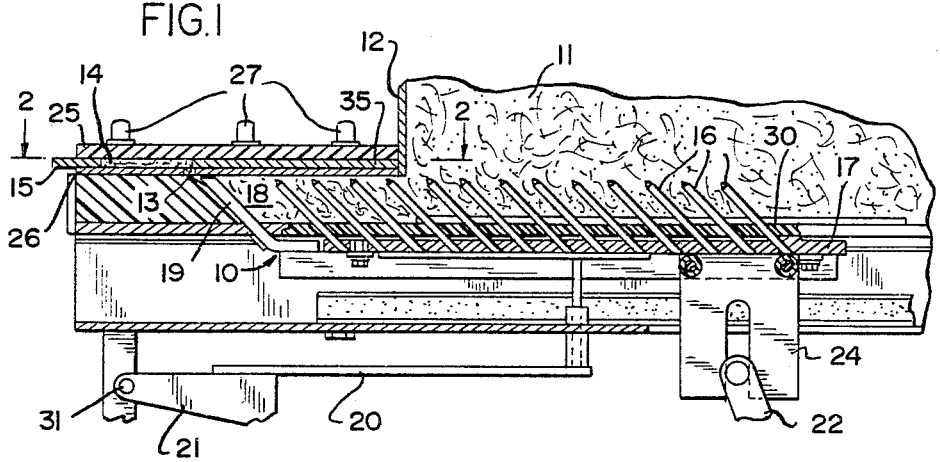
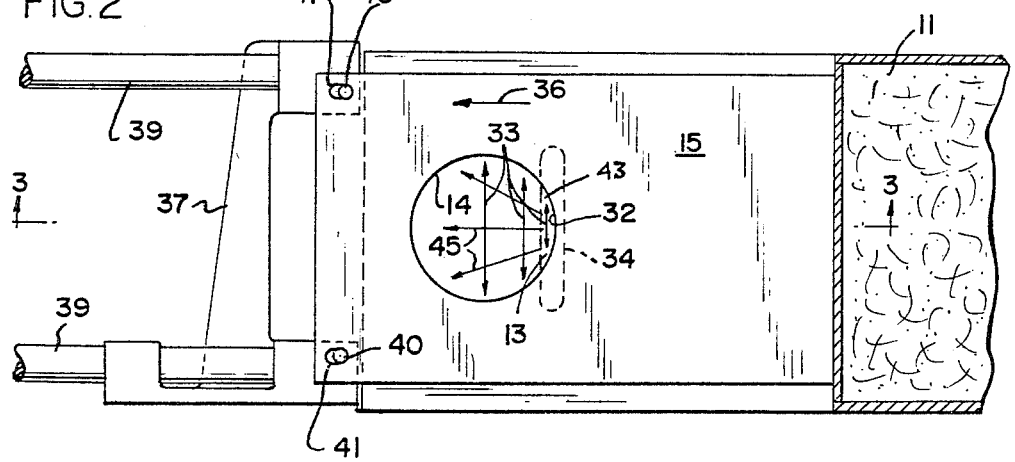
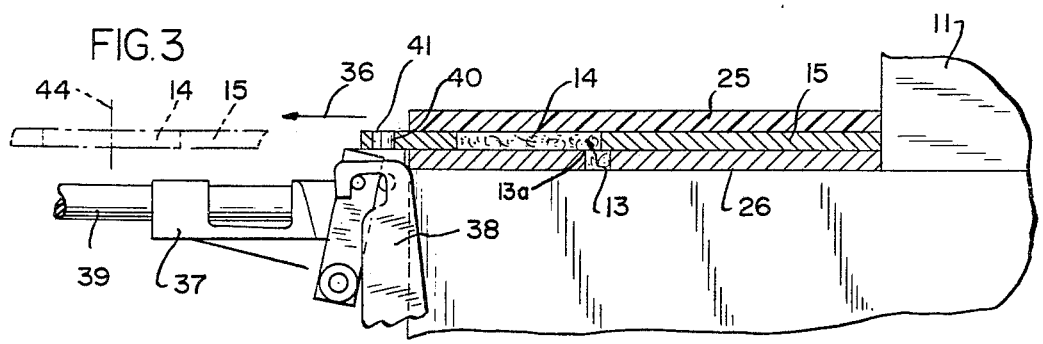
INVENTORS.
LOUIS R. RICHARDS
HARRY H. HOLLY
BY Hofgren, Wegner, Allen, Stellman & McCord.
ATTORNEYS.

United States Patent Office 3,486,186
Patented Dec. 30, 1969

3,486,186
MOLDING APPARATUS
Louis R. Richards, Mokene, and Harry H. Holly, Olympia Fields, Ill., assignors to Hollymatic Corporation, a corporation of Delaware
Filed May 8, 1967, Ser. No. 636,997
Int. Cl. A22c 7/00
U.S. Cl. 17—32                                    5 Claims

ABSTRACT OF THE DISCLOSURE

An apparatus for molding articles of a fiber containing plastic material such as ground meat, fish and similar food products to produce a superior fiber structure in the molded article, the apparatus comprising means for applying pressure to the plastic material to jet the material into a mold cavity of a movable mold after the cavity is moved into juncture with the plastic material supply and means controlling the desired shape and cross sectional area of the jet passage to produce the superior fiber structure.

CROSS REFERENCE

A molding apparatus of the same general type as disclosed herein and disclosing other elements of the apparatus in detail is disclosed and claimed in U.S. Patent 3,293,688 assigned to the same assignee as the present application.

In this patent there is disclosed a supply means for providing a supply of plastic material having an exit opening through which the material which is customarily a food material may be forced, feeder means for moving the material to and through the exit opening under pressure, a mold such as a reciprocable mold plate with a mold cavity therein communicating with the exit opening to receive the plastic material under pressure and sealing means such as upper and lower parallel plates between which the mold plate is reciprocated and closing the sides of the mold except for that portion of one side coinciding with the exit opening when the mold cavity is in filling position. The mold, specifically the mold plate, is movable from a position where the cavity receives the material through the filling opening under pressure to form the article to the shape of the cavity and a position where the cavity is out of communication with the exit opening and on its way to a place of removal of the shaped article.

The apparatus of this invention employs supply means for providing a supply of the plastic material such as a hopper and having an exit opening through which the material is adapted to flow, a mold that is movable relative to the exit opening and having a cavity that is moved out of and into juncture with the exit or filling opening, pressure applying means for applying pressure to the plastic material while the mold cavity is in juncture with the filling opening in order to jet the material into the cavity through the opening beginning at this juncture together with means for limiting the maximum extent of movement of the mold cavity into this juncture so as not to project the edge of the cavity that is nearest the filling opening substantially beyond the more remote edge in the direction of cavity movement during the moving of the cavity into the juncture.

The result of this is that the filling opening is quite small so that the plastic material enters the mold cavity at high speed through a passageway formed by the rear edge of the mold cavity and the front edge of the filling opening making the entrance to the mold essentially a slot extending 90° to the direction of flow which has the desirable result of forcing many of the plastic material fibers to align with the slot which is 90° opposed to the normal tendency for the fibers to align with the direction of flow. This crossing and intermingling of material is very important where the article is ground meat, fish and other food products in order that shrinkage during freezing, cooking or other processing will be substantially uniform in all directions in the article.

One embodiment of the invention is disclosed in the accompanying drawings of which:

FIGURE 1 is a fragmentary vertical sectional view of a molding device similar to the one disclosed more fully in the above patent and showing the feeder means at the completion of its movement toward the filling opening and after the mold cavity has been filled.

FIGURE 2 is a fragmentary sectional view taken substantially along line 2—2 of FIGURE 1.

FIGURE 3 is a vertical sectional view taken substantially along line 3—3 of FIGURE 2.

As is explained in the above patent, feeder means 10 are employed to move the plastic material such as the ground meat 11 from a supply means such as a hopper 12 through an exit or filling opening 13 leading from the supply means into a mold cavity 14 such as the illustrated opening in a reciprocable mold plate 15.

In the accompanying drawings only enough of the molding apparatus structure is shown to illustrate the invention. Thus the feeder means 10 as is explained in detail in the above patent is essentially a four motion feeder means that comprises forwardly sloped spaced pins 16 mounted on a bottom plate 17 and sloped forwardly toward the front of the supply hopper 20 that includes the forwardly extending passage means or tunnel 18. At the front of the plate 17 on which the pins 16 are mounted there is provided a forwardly sloped feeder bar 19 that extends when in the feeding position within the tunnel 18 substantially completely across the generally rectangular cross sectioned passage means 18 from side to side thereof.

In the first of the four motions the feeder means 10 is lowered from the position shown in FIGURE 1 to beneath the hopper 12 but with the ends of the pins 16 received in the horizontally reciprocable pin plate 30. This lowering is accomplished by dropping the lever 20 about its fulcrum 31 by engagement with a cam (not shown) operating on a cam follower 21. Then in the second motion the feeder means is retracted to the right as viewed in FIGURE 1 where the pins 16 and feeder bar 19 are spaced rearwardly of the filling opening 13. In the third motion the feeder means 10 is raised substantially vertically to reintroduce the feeder bar 19 and pins 16 into the bottom of the hopper 12 to substantially the position shown in FIGURE 1 but rearwardly or to the right thereof. Then, the fourth motion moves the feeder means 10 forwardly to the position shown in FIGURE 1 to apply pressure to the plastic material in front of the feeder bar 19.

As is shown in FIGURE 1 the mold plate 15 is reciprocated between top and bottom paltes 25 and 26 that are held in this relationship by the spaced bolts 27. As is true in apparatus of this type, as explained more fully in the above patent, the reciprocating movement of the mold plate 15 is in timed relationship to the movement of the feeder means 10 so that the feeder means moves forwardly or to the left to coincide with the time the mold cavity is in communication with the filling opening 13. In the aforementioned patent the mold plate is so timed that the cavity 14 communicates with the filling opening after pressure is applied by the feeder bar 19 causing the filling of the cavity to take place early, while the entrance formed by the rear of the mold plate cavity 14 and front of the fill slot is still a slit, as opposed to the more open slot formed by the cavity in its normal most rearward position as disclosed in the above patent. This early slot feeding by means of precompression gives the above-mentioned desirable cross grain fill action on small volume molds, such as 6 ounces or less, but requires more power because pressure must be applied early to the feeder bar when the feeder bar crank arm is at a poor leverage position. This invention allows the mold plate to be so timed that pressure is applied by the feeder bar after the mold cavity has been positioned and stopped in the slot filling position by the means for limiting the maximum extent of movement toward the fill opening. Thus the power requirements are considerably less here.

After the edge 32 of the cavity 14 that is nearest the filling opening 13 reaches the limited travel position illustrated in FIGURE 2, the plastic material jets into the mold cavity 14 with normal fiber alignment being in the direction of flow as indicated by the arrows 45 in FIGURE 2 and 90° opposed fiber alignment induced by jet-slit filling as indicated by the arrows 33 due to the pressure of the feeder bar 19. In order that the cavity will be stopped in the silt 43 position, means (described hereinafter) are provided for limiting the maximum extent of movement of the mold to the right or to the position of juncture so as not to project the edge 32 of the cavity 14 substantially beyond the opening as exemplified by the further edge 34. This is important in order to restrict the size of the fill opening to increase the fill veloctiy to jet the plastic material and is important to form and control the silt shape that the material is jetted through.

If the mold cavity edge 32 were beyond or to the right of the filling opening edge 34 the jet stream of plastic material would have to diverge with some going to the left and some to the right. This would tend to cause a weak section in the molded article formed in the cavity 14 which would be conducive to breakage of the article.

Where the plastic material is a food material such as ground meat, fish or the like which contains short fibers and the filling opening has the characteristics described above, the jet projecting of the plastic material through the transverse slot 43 forces a significant proportion of the fibers in a crossed pattern as indicated by the arrows 33 and 45 in FIGURE 2. This not only produces a stronger patty but also one that shrinks substantially uniformly in cooking and other treatment so as to give a better appearance. Thus the round patty (circular) tends to remain round during cooking.

As mentioned earlier, the positioning of the maximum extent of the leading edge 32 of the mold cavity 14 so as to prevent projecting this edge substantially beyond the filling opening prevents diverging of the incoming plastic material entering the cavity 14 from the filling opening 13 but rather causes flow of the plastic material in one general direction or from right to left as illustrated by the arrows 45 of the specific embodiment disclosed. This not only makes a more uniform patty but greatly reduces and ordinarily completely prevents breakage of the patty during cooking. It has been found that especially with ground meat if some the meat flows to the left while some flows to the right, which would be true if the leading cavity edge 32 were beyond or to the right of the opening edge 34, there would be created a line of weakness substantially on a chord of the patty to create a weak edge portion which would tend to break off during cooking. This invention prevents that.

In the structure of this invention the filling opening 13 is elongated with the mold cavity 14 being movable in a path of movement illustrated by the arrow 36 of FIGURES 2 and 3 and back again so that the long dimension, which in FIGURE 2 is the vertical dimension of the filling opening 13, is transverse to this path of movement. In the illustrated embodiment of course this long dimension is substantially at right angles to the path of movement 36.

The mold plate 15 is driven by mold moving means comprising the slidable member 37 moved back and forth on parallel rods by a lever arm 38, all as shown and described in the above co-owned Patent 3,293,688.

The slidable member 37 carries upwardly projecting side pins 40 each engaging an elongated slot 41 in the mold plate that is elongated in the direction of movement of the mold plate as illustrated by the arrow 36 in FIGURE 3. As illustrated in the above-mentioned co-owned Patent 3,293,688 the mold opening 14 is always stopped in the same forward position for removal of the patty as illustrated by the vertical line 44 in FIGURE 3. It is necessary that the stopping be at the same forward position, as illustrated by the broken lines in this FIGURE 3, in order that the removal apparatus will always enter the mold opening 14 at the proper time and remove the patty regardless of the size of the opening 14. In the illustrated embodiment, this change in size of the mold patty, say from 2 ounces up to 16 ounces, is accomplished by substituting mold plates 15 each having a different size cavity 14. In order to accomplish this stopping of the mold cavity 14 at the precise point 44 for most efficient removal of the molded article, regardless of the size of the cavity 14, the pins 40 and slots 41 are provided. By regulating the length of the slots 41 to the size of the mold cavity 14 the rearmost portion of the cavity edge 32 can always be located between the sides 34 of the fill slot 13 regardless of the size of the cavity 14 and the cavity also, regardless of size, will be positioned at substantially the proper removal position 44. This is the chief advantage of the pin 40 and slot 41 arrangement.

As can be seen from the above description, the mold plate 15 in the position shown in the drawings is in its furthest position to the right, or its extreme filling position. When in this position the nearest cavity edge 32 is intermediate the periphery and particularly the parallel longitudinal sides 34 of the filling opening or slot 13. This coinciding of a portion of the mold cavity 14 with the filling slot 13 may be identified as overlap of the cavity and slot. The extent of this overlap, of course, determines the size of the filling opening. In certain specific embodiments the width of this overlap or the maximum width of the segment defined by the arcuate edge 32 of the cavity and the included chord determined by the front edge 34 of the filling opening was found to be about $7/16$ of an inch for both a $1/4$ inch thick two ounce patty and a $3/8$ inch thick four ounce patty. This required overlap for proper filling of the mold cavity 14 can be determined easily by those skilled in the art to provide proper filling of the mold cavity 14. Ordinarily, in molding circular or round patties of from two to sixteen ounces each, this overlap is about $7/16$–$1/2$ inch.

The relationship of the lost motion slots 41 and the size of the patty formed in the cavity 14 is illustrated by the following data from actual production. Thus, in one instance where a two ounce patty was formed in a mold cavity $1/4$ inch thick and $4\frac{1}{8}$ inches in diameter the length of the slots 41 was about $3/8$ inch. In the same machine, but using a mold plate to produce a $1/4$ inch thick and $5\frac{1}{3}$ inches in diameter patty the slots were $3/4$ of an inch long.

The leading edge 32 of the cavity 14 should not project beyond the filling opening for the reasons given earlier. A very small amount of projecting beyond the further edge of the opening is permissible, but this should be kept to a maximum of about $1/8$ of an inch. In other words, for best results the leading edge 32 of the cavity should not project substantially more than $1/8$ of an inch beyond or to the right of the leading edge 34.

By locating the rearmost edge 32 of the mold cavity 14 between the parallel edges 34 of the fill opening 13, the actual exposed fill opening 43 is quite small as can be seen in FIGURE 2. This not only insures that the mold cavity be filled rapidly with a good mixing action, as described above, but also means that the power required of the motor is less because fiber mixing can be achieved without the previously required precompression which required a longer compression cycle.

As stated, the overlap or exposed fill opening 43 is about 7/16–1/2 inch for a round patty. Tests have shown that when these conditions are maintained the plastic food material such as ground meat, fish or the like which of course contains short fibers enters the mold cavity 14 with the fibers apparently randomly oriented so that during cooking of the patty the round shape is maintained substantially uniform during the usual cooking shrinkage. Although this invention is not dependent upon any particular theory, it is believed that when the fill opening overlap 43 is much larger than this, the fibers enter the cavity 14 parallel to each other end in the direction of flow or from right to left as viewed in FIGURE 2 with the result that during cooking the patty tends to shrink excessively in this direction so that an oval instead of a round cooked patty is produced. On the other hand, it is believed that when the fill opening overlap 43 is much smaller than this, the fibers tend to orient themselves transverse to the direction of filling or up and down as viewed in FIGURE 2 with the result that an oval cooked patty is again produced, but this time with excessive shrinkage in this up and down direction. As stated, this of course is only a theory however, it has been observed that when the 7/16–1/2 inch overlap is maintained the round patty tends to shrink substantially uniformly during cooking. This is especially true when the exit or fill opening 13 length is about four to six times its width. A further preferable condition to achieve this uniform shrinkage during cooking is to provide the supply means exit opening 13 with a generally right angled edge 13a adjacent the cavtiy which of course is the upper left corner of the edge of the opening 31 as viewed in FIGURE 3.

Having described our invention as related to the embodiment shown in the accompanying drawings, it is our intension that the invention be not limited by any of the details of description, unless otherwise specified.

We claim:

1. Apparatus for molding a round patty of plastic food material that shrinks during cooking and the like to aid in maintaining substantially uniform shrinkage, comprising: supply means for providing a supply of said material; means for providing an exit opening from said supply means; a mold having a round mold cavity defined by an edge and movable in a path into and out of juncture with said exit opening; means for thusly moving said mold; means for applying pressure to said material to jet said material into said cavity during said juncture; and means for limiting the maximum extent of said movement of the mold into juncture so as not to project the cavity edge that is nearest said opening substantially beyond said opening and to provide a filling overlap of said cavity to said opening, said exit opening is elongated in a direction transverse to said path and said overlap has a maximum width parallel to said path of about 7/16 inch.

2. The apparatus of claim 1 wherein said means for limiting the maximum extent of said movement of said mold comprises means for locating said edge of said cavity that is nearest said opening in position intermediate the periphery of said opening during said jetting.

3. The apparatus of claim 1 wherein said opening has a length about 4 to 6 times its width.

4. The apparatus of claim 1 wherein said supply means exit opening has a generally right angled edge adjacent said cavity over which said material flows during filling of said cavity.

5. The apparatus of claim 1 wherein said path has opposite extreme positions for said cavity, said mold is interchangeable with others having varying mold cavity capacities, and there are provided means for locating the mold cavity of each mold in substantially the same position at each of said extremes, one of said extreme positions being at said juncture and the opposite extreme being a patty removal position.

References Cited

UNITED STATES PATENTS

| | | | |
|---|---|---|---|
| 2,706,830 | 4/1955 | Holly | 17—32 |
| 3,203,037 | 8/1965 | Anhanger et al. | 17—32 |
| 3,293,688 | 12/1966 | Holly | 17—32 |

LUCIE H. LAUDENSLAGER, Primary Examiner